United States Patent
Lopez

(10) Patent No.: US 8,616,310 B2
(45) Date of Patent: Dec. 31, 2013

(54) APPARATUS FOR FARMING, GARDENING AND LANDSCAPING

(75) Inventor: Gilbert Thomas Lopez, Longmont, CO (US)

(73) Assignee: Gilbert T. Lopez, Longmont, CO (US)

( * ) Notice: Subject to any disclaimer, the term of this patent is extended or adjusted under 35 U.S.C. 154(b) by 426 days.

(21) Appl. No.: 13/007,507

(22) Filed: Jan. 14, 2011

(65) Prior Publication Data

US 2012/0181095 A1   Jul. 19, 2012

(51) Int. Cl.
   *B60K 17/28*   (2006.01)

(52) U.S. Cl.
   USPC ....... 180/65.1; 180/53.1; 180/53.2; 180/53.3; 180/53.5; 180/53.7

(58) Field of Classification Search
   USPC .............................. 180/65.1–65.9, 53.1–53.7
   See application file for complete search history.

(56) References Cited

U.S. PATENT DOCUMENTS

| | | | |
|---|---|---|---|
| 7,077,221 B2 * | 7/2006 | Vuksa et al. | 180/53.1 |
| 7,146,810 B1 * | 12/2006 | Hauser et al. | 60/486 |
| 7,278,502 B2 * | 10/2007 | Trefz et al. | 180/53.1 |
| 7,575,077 B2 * | 8/2009 | Priepke et al. | 180/53.3 |
| 7,726,425 B2 * | 6/2010 | Ishii et al. | 180/53.4 |
| 7,766,105 B2 * | 8/2010 | Albright et al. | 180/53.61 |
| 8,312,947 B2 * | 11/2012 | Goulet et al. | 180/53.1 |
| 2003/0127267 A1 * | 7/2003 | Kowalvk et al. | 180/233 |
| 2003/0172638 A1 * | 9/2003 | Ameye et al. | 56/16.4 R |
| 2006/0042843 A1 * | 3/2006 | Yasuda et al. | 180/65.1 |
| 2006/0148607 A1 * | 7/2006 | Rodeghiero et al. | 475/83 |
| 2007/0007052 A1 * | 1/2007 | Young et al. | 180/53.4 |
| 2007/0193816 A1 * | 8/2007 | Hidaka | 180/374 |
| 2007/0281815 A1 * | 12/2007 | Gollner | 475/72 |
| 2009/0038186 A1 * | 2/2009 | Osswald et al. | 37/413 |
| 2010/0300778 A1 * | 12/2010 | Miyazaki et al. | 180/53.3 |
| 2011/0290570 A1 * | 12/2011 | Goulet et al. | 180/53.1 |
| 2012/0061158 A1 * | 3/2012 | Gotou | 180/65.1 |
| 2012/0247846 A1 * | 10/2012 | Ichikawa | 180/65.21 |
| 2013/0144472 A1 * | 6/2013 | Ruth et al. | 701/22 |

\* cited by examiner

Primary Examiner — Jeffrey J Restifo
Assistant Examiner — Erez Gurari

(57) ABSTRACT

The instant invention is an electric machine/tractor particularly intended for farming, gardening and landscaping and is nonpolluting and self charging. The tractor accommodates standard farm implements and can supply electrical power to remote areas. To achieve these goals, the machine is comprised of a frame and wheels which are driven independently by hydraulic motors powered by a variable volume, hydrostatic pump that is driven in line, by an electric motor that also drives a hydraulic lift pump and a power-take-off shaft through belts. The hydrostatic pump is controlled by the operator for forward and reverse motion. The electric motor is powered by batteries and the batteries can be recharged by an on-board photoelectric panel. A combination charger/inverter is located aboard the tractor to charge the batteries from any 110V A.C. power outlet or generate 110V A.C. electrical power from the tractor.

6 Claims, 7 Drawing Sheets

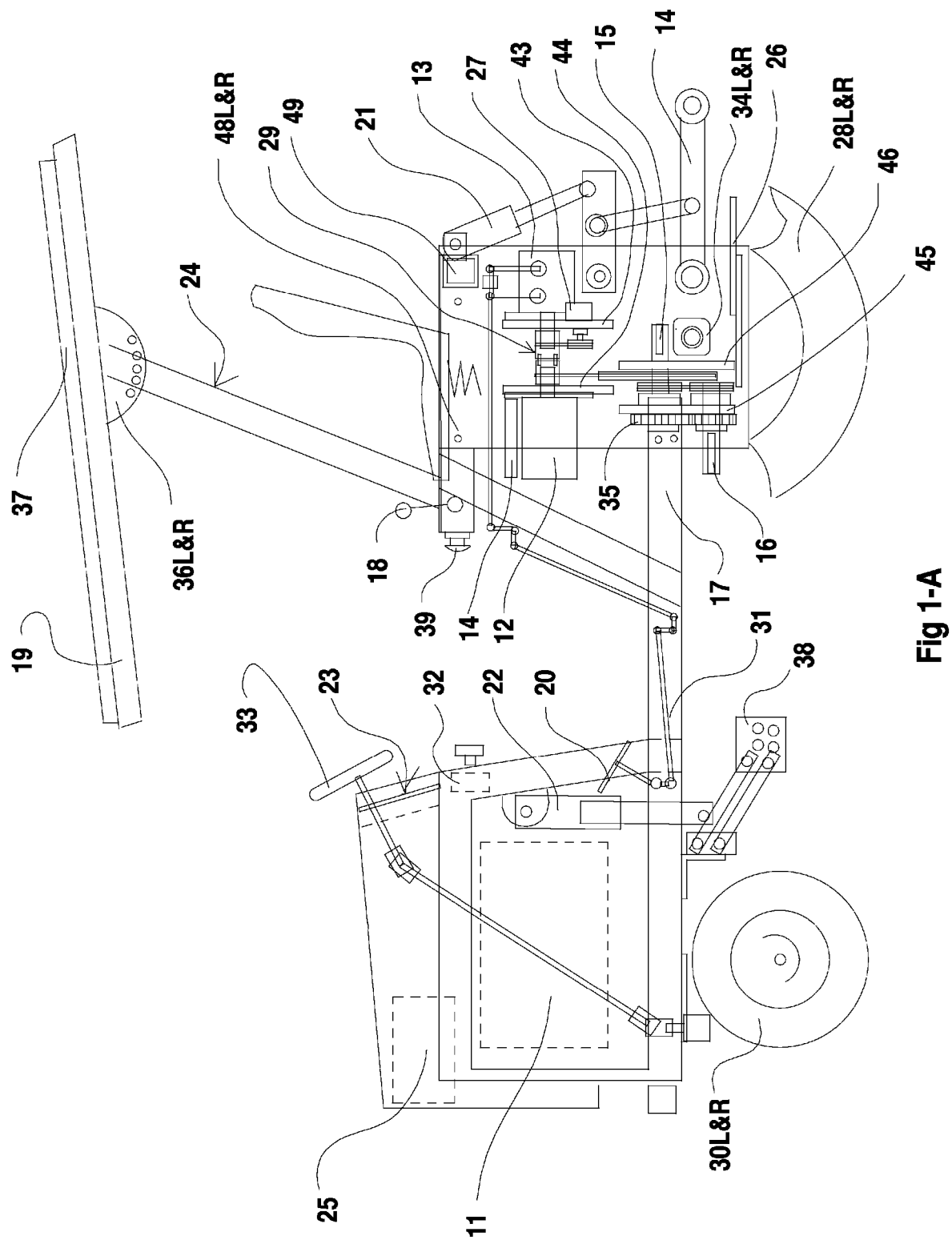
Fig 1-A

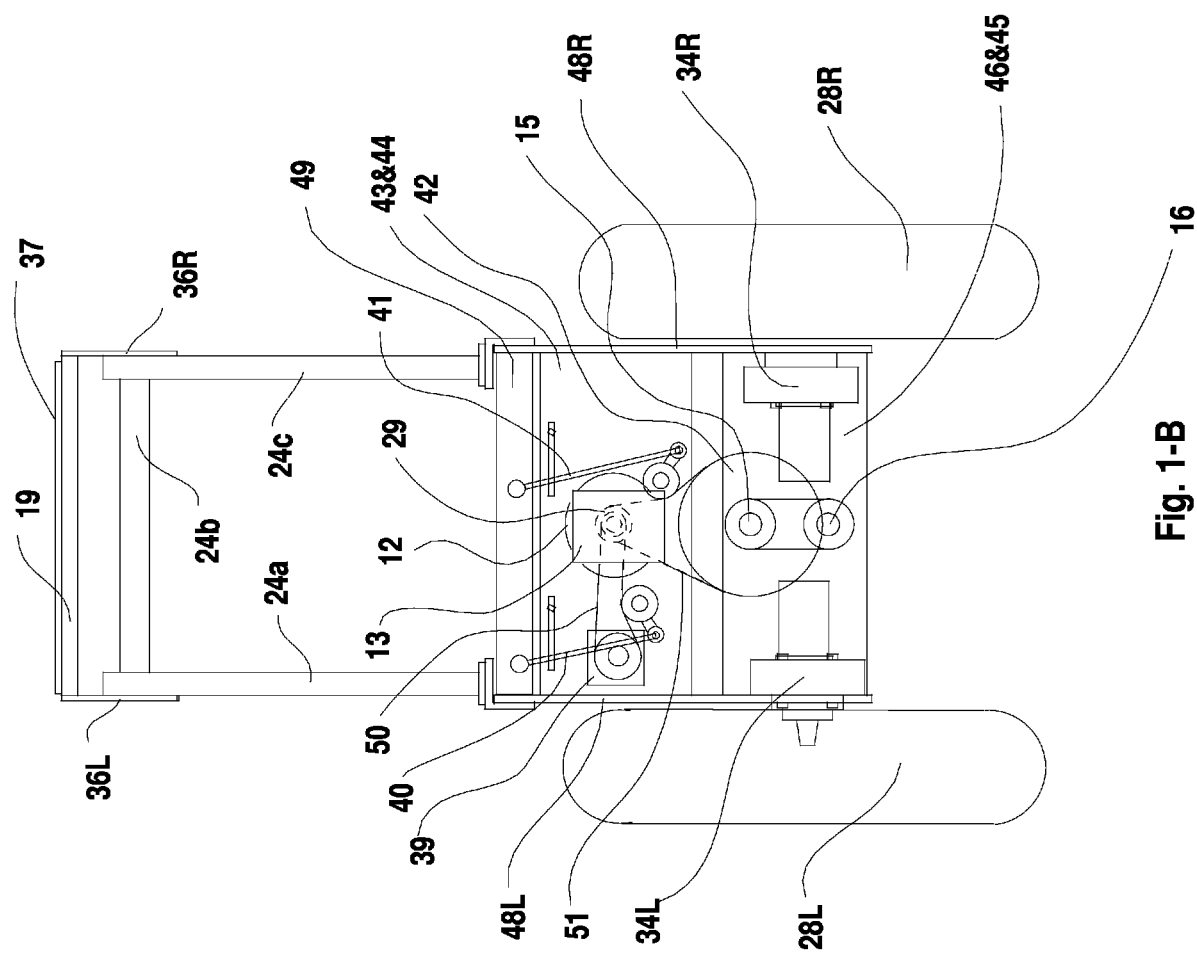
Fig. 1-B

APPARATUS FOR FARMING, GARDENING AND LANDSCAPING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Farm tractors have been used for over a hundred years and have been a major factor in improving the efficiency of agriculture. Further, farm attachments have evolved around the three point hitch to provide a high level of efficiency and flexibility. Recently, concerns about the cost, safety, maintenance and negative environmental impact of fossil fuel burning tractors has kindled an interest in electric tractors.

U.S. Pat. No. 4,347,907 to Downing, Jr. (1987) is an electric tractor driven by A.C. motors controlled by cycloconverters. The invention mentions a technique for varying the wheel speeds as a function of steering and suggests powering farm implements with more A.C. motors. The invention also mentions an A.C. outlet for non-motor driven accessories only and does not incorporate the use of hydraulic motors for torque at the wheels.

U.S. Pat. No. 4,662,472 to Christianson et al (1987) proposes a nominal DC voltage of 128 volts to drive the tractor wheels via a single motor mounted on the frame. A second electric motor is mounted to a front frame member. This electric motor is used to drive a power-take-off shaft and hydraulic articulation steering system. Articulated steering is not ideal for operating rear mounted farm implements because turning applies undue sideways forces on the parts making ground contact.

U.S. Pat. No. 5,743,347 to Gingerich et al (1998) discloses a lawn and garden tractor having independent electric motors for each driven wheel. Each of the rear wheels is provided with a respective speed sensor. A control system in the tractor feeds extra power to one of the two motors when a wheel encounters an obstacle. Also mentioned is a method of providing a hydraulic lift for attachments but no power take off (PTO) provision is mentioned therefore all attachments must supply their own power. One embodiment of this design incorporates swivel wheels in the front which are not practical for row crop farming. The suggested electronic control system is highly sophisticated with many expensive components that could fail or need modifying to provide for the wide range of conditions in which farm tractors must operate. Further, Gingerich suggests measuring resistance in the field windings of each drive motor to gauge the speed at each wheel, however, he does not take into account the resistance to motion at the wheel that could affect accuracy. Further the patent mentions nothing about how it would support the use of standard farm implements except for a self propelled weeder.

U.S. Pat. No. 5,890,555 to Miller (1998) describes an electric vehicle and more specifically a regenerating system for braking but does not include any solutions for slow speed agricultural use.

U.S. Pat. No. 6,089,341 to Gingerich et al (2000) appears to be a refinement of U.S. Pat. No. 5,743,347 by Gingrich (1998) that still does not propose the use of hydraulics to apply torque to the drive wheels or how to attach standard farm implements.

U.S. Pat. No. 6,454,032 to Teal, et al. (2002) describes a method of balancing and controlling the propulsion and steering of a lawn mower but does not propose how the machine would propel or connect with modern farm implements.

U.S. Pat. No. 7,828,099 to Heckeroth (2010) discusses a generic approach to putting batteries and an electric motor on rails but has no suggestions on how to make it work or how to integrate it with modern farming technologies. The invention also does not suggest the integration of hydraulic power in the configuration that would enhance its performance.

U.S. Pat. No. 7,040,445 to Ishii (2010) suggests a method of controlling the steering of a hydraulic driven machine. It does not propose any solutions for making the machine function in farming or gardening applications.

SUMMARY

The instant invention is particularly intended to provide a nonpolluting self charging tractor for performing farming and landscaping functions incorporating the use of standard farm implements. To achieve these goals the tractor is comprised of: a frame with wheels, a bank of rechargeable batteries, an electric motor, hydrostatic pump and hydraulic motors at the wheels. Further, a standard category one three-point hitch is included with two power-take-off shafts to supply rotational power as needed at the rear or mid section of the tractor. Still further two hydraulic cylinders are attached to provide lift implements at the rear or mid section of the tractor. Still further, integral to the canopy is an array of photoelectric panels to recharge the batteries and an onboard charger for charging from a standard electric service and an inverter to provide A.C. voltage at remote locations as needed.

BRIEF DESCRIPTION OF THE DRAWINGS

FIG. 1-A is a side view elevation of the machine/tractor detailing its pertinent features.

FIG. 1-B is a rear view elevation of the tractor detailing its pertinent features.

DETAILED DESCRIPTION OF THE PREFERRED EMBODIMENT OF THE INVENTION

Figure 2:
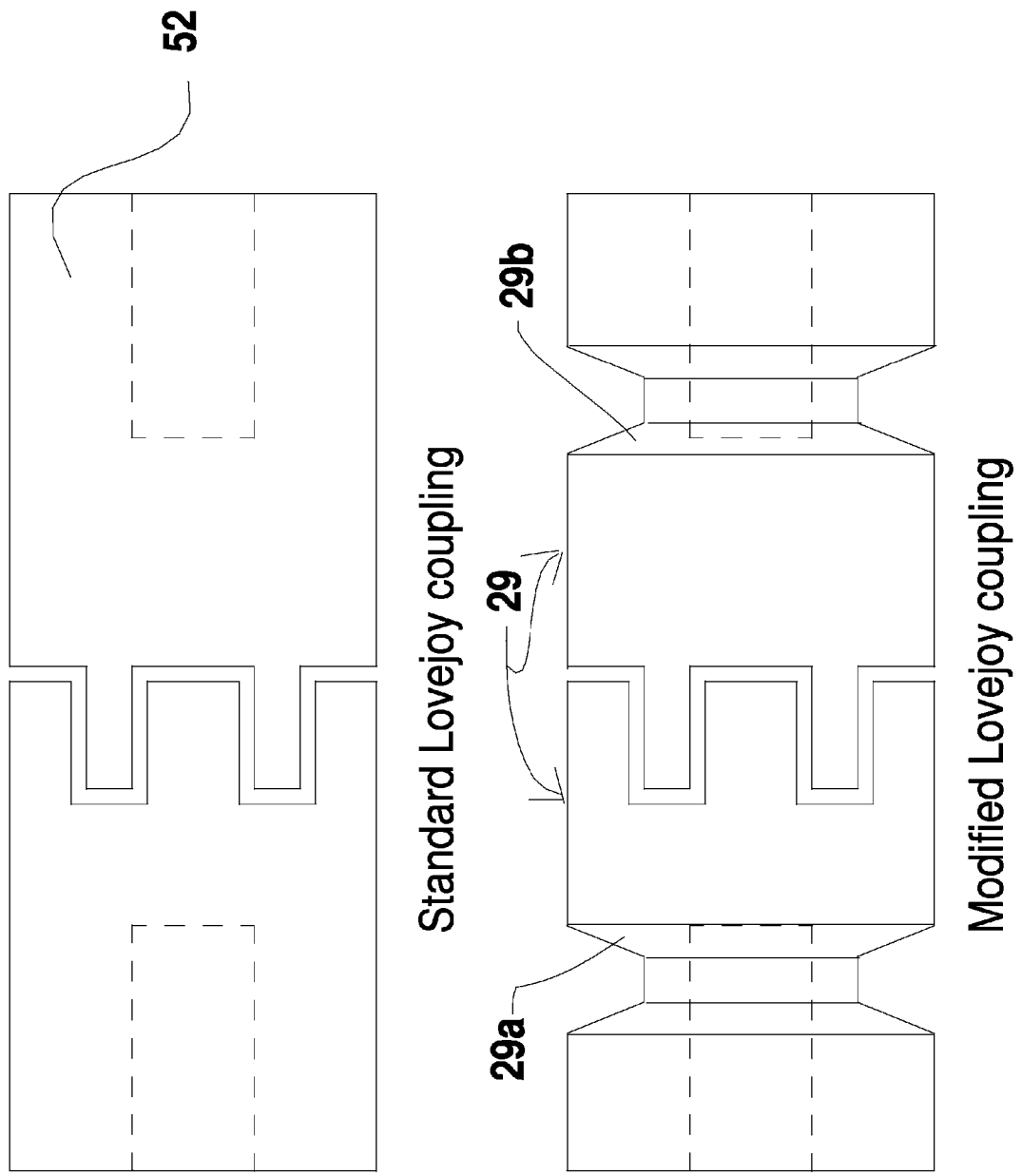
FIG. 2 is an elevation view of a standard and a modified Lovejoy coupling.

Referring to FIG. 1 for a left side elevation view of one embodiment of the instant invention it may be seen that the apparatus comprises a metal frame 17 that supports front wheels 30L&30R, rear wheels 28L&28R, batteries 11, electric motor, motor 12, hydrostatic pump, pump 13, hydraulic motors 34L&34R, category 1 three point hitch 14, mid section lift hitch 38, roll bar and canopy support 24, canopy angle adjustment bracket 36, canopy frame 19, photovoltaic panel 37, seat 35, mid section lift 22 and rear hitch lift 21. A control lever 20 actuates the pump 13 that drives the tractor in the forward and reverse directions and the tractor is steered with the steering wheel 33. A mid section lift 22 and a rear power-take-off/PTO is driven by a belt from a modified Lovejoy coupling 29. The same coupling drives the auxiliary hydraulic pump 39, and connects directly to the hydrostatic pump 13. A mid section PTO 16 is driven by the rear PTO shaft through a belt or by gears if it is required to run in a reverse direction. An inverter/charger 25 is positioned in front near the batteries and is switched from the control panel 23 to charge the batteries or export electrical power. The electric motor and hydrostatic drive are mounted to cross plates 43 & 44 that are mounted to side plates 48 L&48R that in turn are mounted to the frame 17. In the same manner the cross plates 45&46 hold the two PTO shafts and are mounted to the side plates. The main hydraulic oil reservoir 49 is also bolted to the side plates for stability and also functions also as a support for the hydraulic lift cylinder 21. A hitch 26 for pulling implements also connects to the side plates. Canopy 19 supports solar panels 36 and is supported by roll bar assembly 24 and can be tilted to absorb maximum energy when stationary via hinge 36. An on board electric inverter/charger 25 is provided to charge the batteries from any A.C. jack when needed and can be switched to provide A.C. power to power tools or any standard A.C. electrical devices as needed.

FIG. 1-B is a rear view elevation of the tractor showing the roll bar and canopy support assembly 24 and the locations of the top cross plate 43, the bottom cross plate 46 as connected to the side plates, 48L and 48R. Also shown is the position of the hydrostatic pump 13 directly behind the motor 12. A V belt 50 is shown connecting the drive coupling 29 with the driven auxiliary hydraulic pump 39 and is actuated by lever 40. Also a V belt 51 is shown connecting the drive coupling 29 with the driven PTO shaft 15 actuated by lever 41. The PTO shaft 15 is shown driving the mid section PTO shaft 16 through a V belt. Also shown are the left rear wheel 28L and right rear wheel 28R as they are connected respectively to hydraulic motors 34L and 34R that are mounted on the side plates, 48L and 48R.

FIG. 2 Shows a standard Lovejoy coupling 52 and the modified Lovejoy coupling assembly 29 with a pulley slots 29a and 29b machined to drive V-belts.

Figure 3:
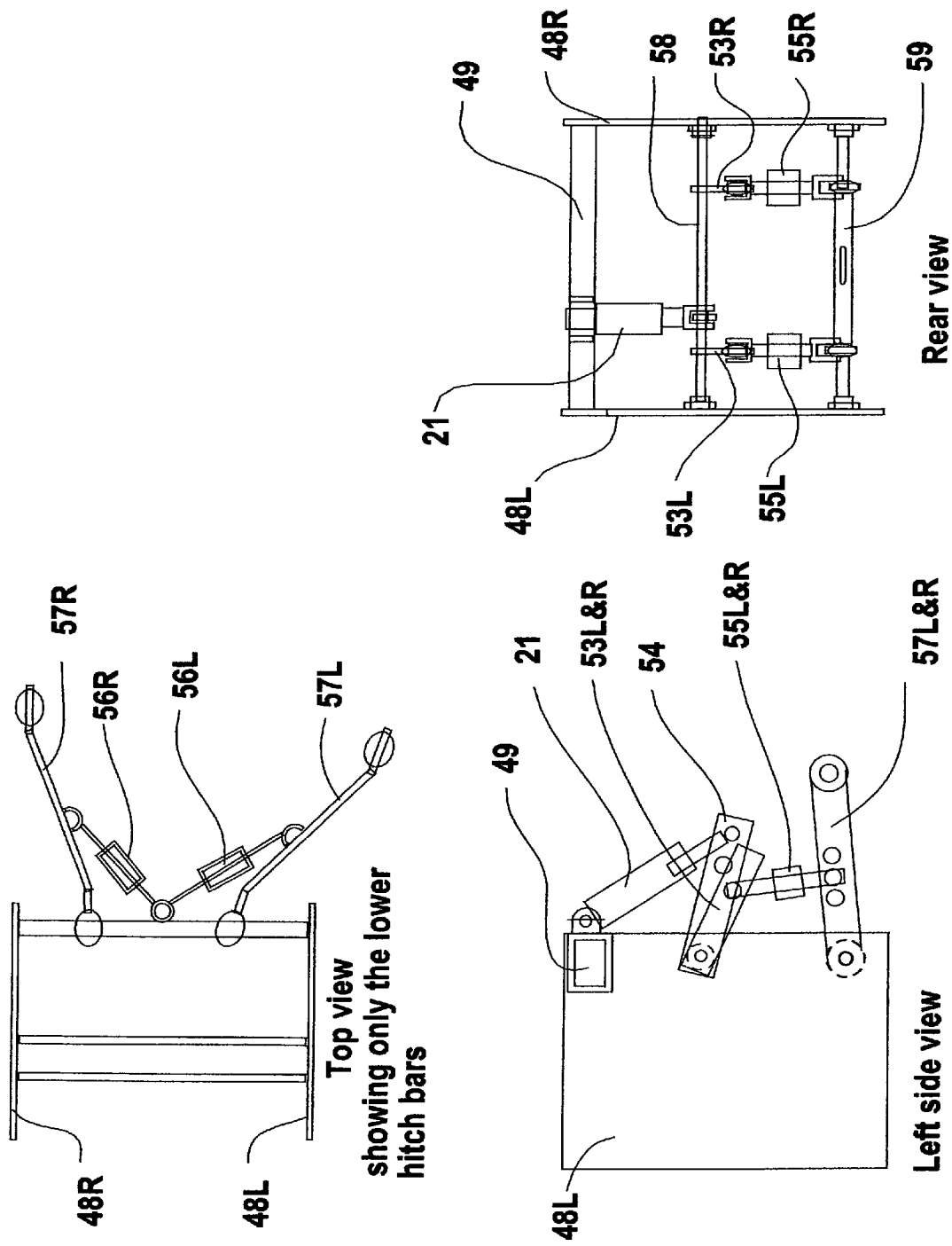
FIG. 3 is side, top and rear elevation of the three-point hitch assembly.
Figure 4:
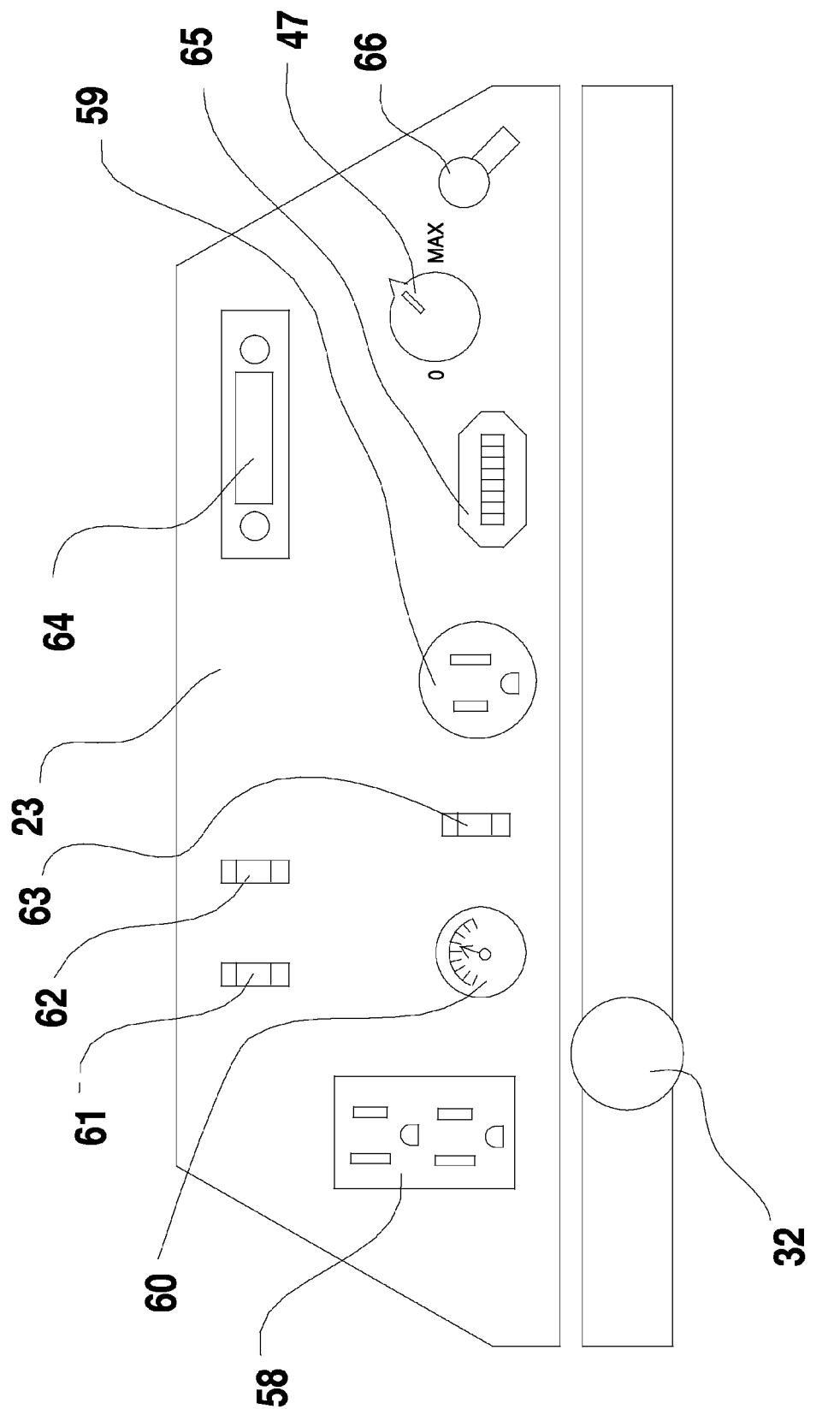
FIG. 4 is a view of some of the features or the front panel facing the operator.

FIG. 3 Shows three elevation views of the three point hitch design where the side plates 48L and 48R form the frame for the for the swivel rods 58 and 59. The side plates also are connected to, and supported by the oil reservoir 49 that also supports the upper end of hydraulic cylinder 11. The cylinder applies torsion to the bar 58 which raises and lowers the leveling bars 53L and 53R which in turn raise and lower hitch attachment bars 57L and 57R. Hand adjustments for each lower hitch attachment bar are shown as 55L and 55R FIG. 4 is a view of the front panel 23 showing the output plug 59, solar charging meter 60, front light switch 61, rear view work light 62, inverter/charger mode switch 63, radio 64, input charging jack 59, battery status indicator 65, motor speed adjust 47 and chassis ground switch 66, Also shown below the panel is the rear/mid hydraulic switch 32.

Figure 5:
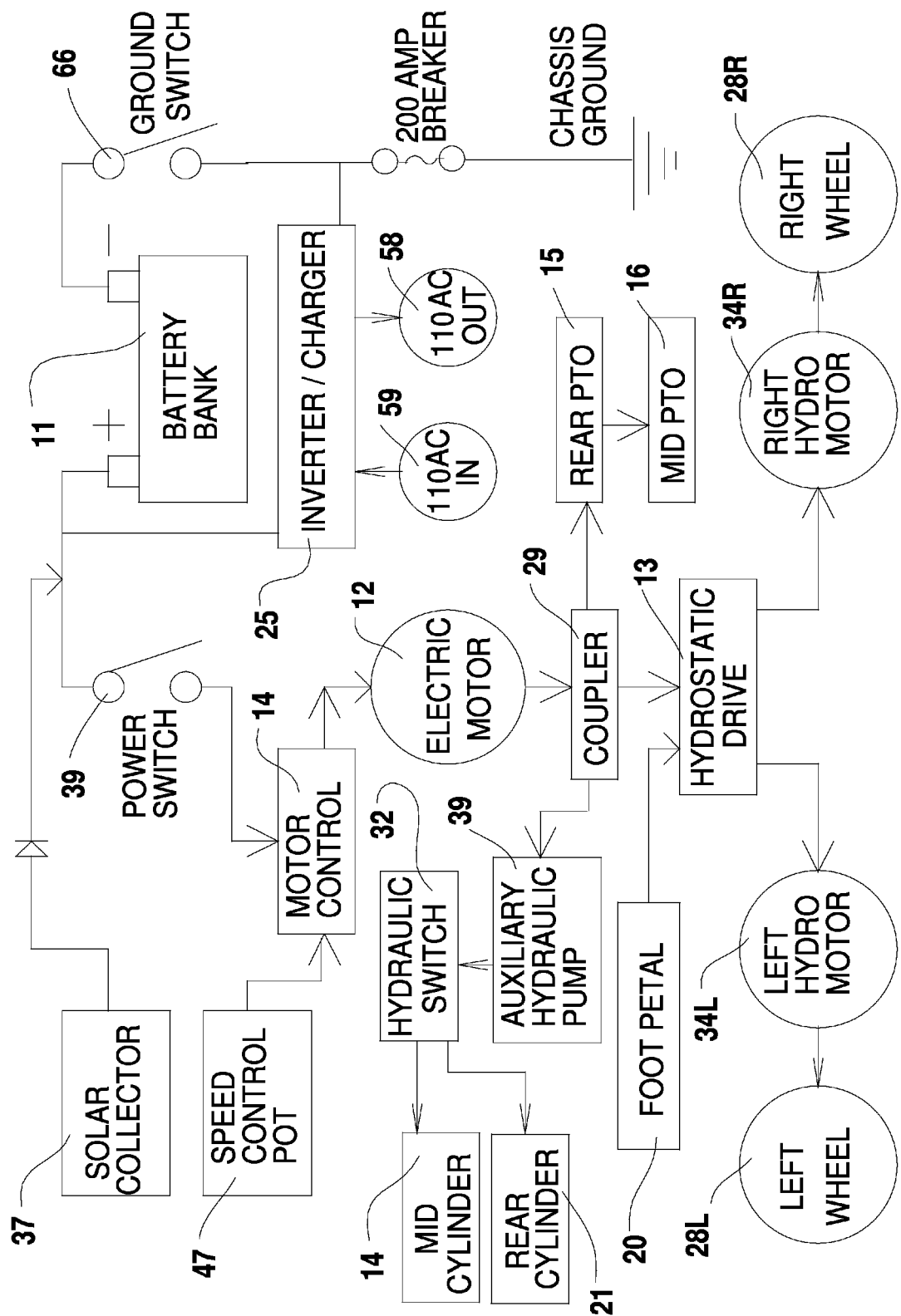
FIG. 5 is a functional diagram of the drive system for the tractor shown in FIGS. 1 and 2

FIG. 5 is a functional diagram of the main elements of the invention showing the batteries 11 being charged via the inverter/charger 25 and the solar collector 37 Also shown is the electric motor driving PTO shafts 15 and 16 and the auxiliary hydraulic pump 27 directly via the coupler 29 and through the coupler to the hydrostatic pump 13 that is supplying hydraulic energy through the hydraulic motors 34L and 34R to the wheels 28L and 28R respectively. A motor control unit 14 powers the motor 12 the speed of which is operator controlled through the potentiometer 47. The forward and reverse wheel speeds are directed to the pump 13 by a foot petal 20.

Figure 6:
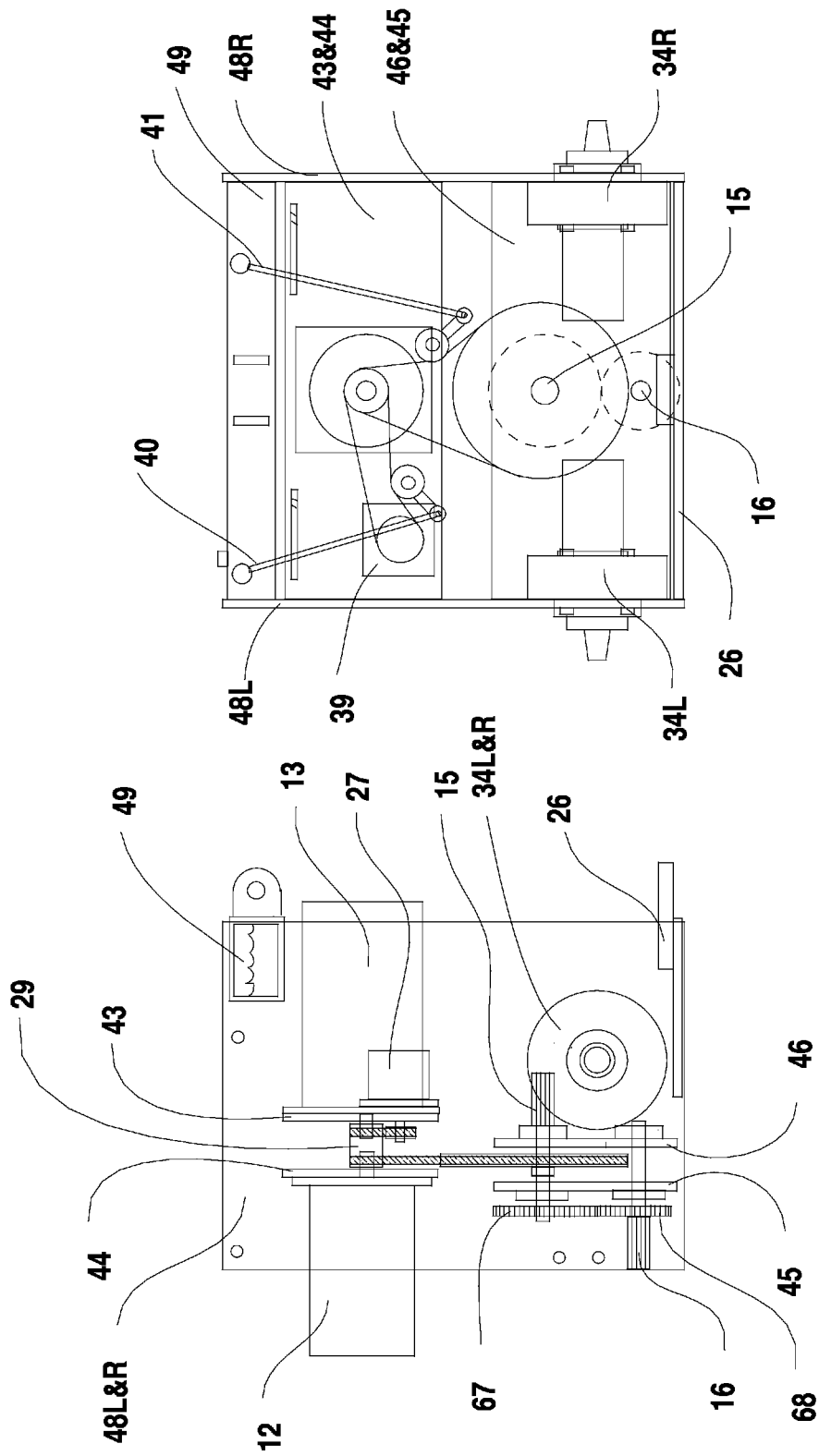
FIG. 6 is a side and rear elevation of the detachable power distribution module.

FIG. 6 is an elevation of the left and rear views of the power distribution module as a separate functional entity from the tractor showing the relative positioning of the electric motor 12 and the hydrostatic pump 13 as they are connected together by the coupler 29 that also drives the auxiliary hydraulic pump 39 and the rear PTO shaft 15 which drives the mid PTO shaft. The auxiliary hydraulic pump and the two PTO shafts and are engaged by levers 40 and 41 respectively. The module's outer frame is comprised of the side plates 48L and 48R and are held rigid by the upper cross frames 43 and 44 as will as the lower cross frames 45 and 46 as well as the hydraulic fluid reservoir 49 and the trailer hitch 26. The hydraulic motors 34L and 34R are firmly bolted to the side plates. The side frames contain holes for mounting but alternatively could be welded into a vehicle or fixed frame as required.

Advantages

By modifying the Lovejoy coupling 29 to drive two outputs via belts 50 and 51 while driving the hydrostatic pump 13 directly through the same coupling we have achieved an efficient way of distributing maximum power where it is needed from the electric motor. Thus if the tractor is pulling a plow, the bulk of the power is expended through the hydrostatic pump to the wheel motors with little drain from the belts. Additionally, if the tractor is running a tiller or a mower, the belts are consuming the bulk of the power from the motor while the energy to drive the tractor forward via the pump is minimal. By incorporating the standard three-point hitch in the embodiment, the usability is enhanced well beyond other electric gardening vehicles. This advantage is made possible by the simple, yet strategic frame design where the side plates comprise an assembly that contains the motor and pump mounting plates, the two PTO shafts mounting plates, the three point hitch assembly, the hydraulic reservoir, the hydraulic motors and the rear wheels FIG. 6. This assembly could be manufactured separately from the rest of the tractor and shipped in much smaller containers than the full sized tractor then installed later on a final assembly line or at different destinations as a modular unit. As a further step toward a non-polluting farm tractor and extending its usefulness after dark this design uses high output/efficiency LED light beams that consume ⅛ the electrical power compared to conventional incandescent lighting. This invention is quiet, compact and emits zero odors or emissions of any kind thus it will find broad usage in sustainable agriculture, urban landscaping and greenhouse gardening. The inclusion of an on board 2500 watt inverter enables the tractor to use inexpensive 110V gardening and landscaping tools such as chain saws, tree trimmers hedge trimmers, power circular saws, drills, drill presses, air compressors and any other tools up to 3½ horsepower on this embodiment. The mobility of the tractor itself and the advantage of the inverter will make it very useful not only for farming, gardening and landscaping but for remote construction projects and even supplying power to barns, outbuildings and cabins.

Alternative Embodiments

The instant embodiment is based on the use of inexpensive 6V golf cart batteries running in series at 48V DC while the 48V solar array described can produce up to 200 Watts during daylight hours. This basic design can be scaled upward to increase performance by using larger components. The single dual stage hydrostatic pump could be replaced by two tandem running single stage pumps. Improved batteries will extend the operating time between charges as advanced battery designs become available. Charging time from the solar array will be reduced as new technologies and mass production methods produce solar panels with greater watts per square meter. The tractor can also be plugged into roof mounted solar arrays when available to charge the batteries at a faster rate. Also, by running the tractor at a higher voltage, power and endurance could again be increased by reducing resistance in the wiring and the current draw from the batteries. Although this embodiment uses a modified Lovejoy coupling, other couplings like U-joints or custom built couplings can be made to work as well. The power distribution module can be scaled up or down to drive larger or smaller tractors as required using basically the same juxtaposition of components. The said module can also be adapted to drive backhoes, ditchers and other farming and landscaping equipments.

I claim:

1. An electric farm tractor, designed to use standard three-point or other farm implements and can provide electrical power to remote areas which has a frame wherein:
    the vehicle includes an electric motor;
    the vehicle includes batteries;
    the vehicle includes a photovoltaic panel or panels integrated in the canopy to provide electricity to recharge the batteries;
    the vehicle includes a two stage hydrostatic drive pump;
    the vehicle includes a hydraulic lift pump;
    the vehicle includes two hydraulic motors;
    the vehicle includes left and right drive wheels;
    the vehicle includes a steering wheel that guides the machine;
    the vehicle includes a three-point hitch;
    the vehicle includes a rear PTO shaft;
    the vehicle includes a mid frame PTO shaft;
    the vehicle contains a mid frame hydraulic cylinder and a hitch to mount implements under the middle section of the frame;
    the vehicle includes an inverter to provide an AC electrical power outlet;
    the vehicle includes a charger to charge the batteries from an AC power source.

2. The vehicle of claim 1 containing an energy distribution module which distributes power between that for ground motion and that required for lifting, steering and powering attachments.

3. The structural configuration of claim 2, wherein the electric motor is directly coupled to the hydrostatic pump and positions the two PTO shafts and auxiliary hydraulic pump to be driven by the same coupling via rotational energy connecting elements.

4. The energy distribution module of claim 2 comprising a frame which contains two side plates that are solidly attached to, and supported by, four cross plates, the hydraulic reservoir, and the rear hitch;
    wherein said frame is detachable, self supporting and is connected to the tractor frame by bolts and/or welding.

5. The energy distribution module of claim 2 wherein connection between the shafts of the motor and hydrostatic drive pump are cushioned by a flexible substrate to minimize the effects of misalignment and vibration and with pulleys machined into each of the input and output halves of the coupling, whereas the connections are independently secured on the opposing rotating shafts and drive their respective loads through belts to provide additional buffering from vibration and misalignment.

6. The energy distribution module of claim 2 is fitted with a backhoe, ditch digger, hole digger or any device that can perform work upon, in or above the ground.

* * * * *